3,086,958
BLENDS OF HIGH PRESSURE TYPE POLYETHYLENE WITH CRACKED HIGHLY CRYSTALLINE 1-OLEFIN POLYMERS
Peter J. Canterino and Robert J. Martinovich, Bartlesville, Okla., assignors to Phillips Petroleum Company, a corporation of Delaware
No Drawing. Filed Nov. 17, 1958, Ser. No. 774,154
5 Claims. (Cl. 260—45.5)

This invention relates to polyethylene. In one of its aspects, this invention relates to blends of so-called high pressure polyethylene with low molecular weight, high crystalline polymers of 1-olefins. In another aspect, this invention relates to blends of high pressure polyethylene with a material resulting from thermal cracking of aliphatic 1-olefin polymers of high molecular weight and high crystallinity.

The polymerization of ethylene to solid polymers at high pressures in the presence of a small amount of a peroxide or no catalyst is well known in the art, such a method being disclosed in U.S. Patent 2,153,553, Fawcett et al. Polymers prepared by such high pressure methods are referred to herein as high pressure polyethylene. Polyethylenes of this type are presently being employed for the manufacture of bottles, containers, and other items of commerce. However, one of the major disadvantages of high-pressure polyethylene has been its relatively low melting point and its lack of stiffness.

It is now discovered that new materials of greatly improved physical properties can be prepared by blending high-pressure type polyethylene with the material which results from the thermal cracking of aliphatic 1-olefin polymers of high molecular weight and high crystallinity.

It is, therefore, an object of this invention to provide a high pressure polyethylene of superior physical properties.

It is another object of this invention to provide a means of improving the melting point and stiffness of high-pressure polyethylene.

Other objects, advantages and features of this invention should become apparent from the following detailed description of the invention.

According to this invention, 5 to 75 parts by weight of a cracked polymer having a crystallinity of at least 75 percent and a molecular weight in the range 2,000 to 12,000 is blended with 95 to 25 weight parts of a high pressure polyethylene.

The high molecular weight polymers which are cracked to prepare the cracked polymer useful in this invention have a molecular weight of at least 25,000, a crystallinity of at least 75 percent, and a crystalline freeze point of at least 225° F. As is known to those skilled in the art, this molecular weight would be determined by inherent viscosity method. Such polymers will have a density of at least 0.930, a crystallinity of at least 75 percent and the preferred polyethylene will have a crystallinity of at least 90 percent. Polymers prepared from mixtures of monomers comprising ethylene and propylene or ethylene and butene-1 will be referred to herein as ethylene polymers. The term "polymers" is used herein to designate both homopolymers and copolymers. The monomers employed to produce the polymers which are cracked are normal monoolefins having a terminal double bond and contains 2 to 4 carbon atoms per molecule, e.g., ethylene, propylene, and 1-butene.

The method for determining inherent viscosity is to dissolve 0.1000 gram of the polymer in 50 ml. of tetralin at room temperature. The viscosity of the solution at 130±0.2° C. is then determined by means of an Ostwald-Fenske viscosimeter (size 50, 0.8–3.0 centistokes). The viscosity of tetralin is also determined under these conditions, and the relative viscosity, $Vr$, of the polymer solution to the solvent is calculated. Molecular weight is then calculated by the formula:

$$Mw = \frac{K(2.303) \log Vr}{C}$$

where $Mw$ is molecular weight, $K$ is $2.445 \times 10^4$, $Vr$ is the relative viscosity as above, and $C$ is 0.183 gram per 100 cc. (that is, the concentration is corrected for the expansion of the tetralin from room temperature to 130° C.). This method is essentially the same as reported by Kemp and Peters, Ind. & Eng. Chem., 35, 1108 (1943).

Density is determined as follows: a $\frac{1}{16}''$ thick slab is compression molded by heating the polymer between suitable press platens, maintained at a temperature of 325° F. for 5 minutes, and then pressing the polymer at 20,000 p.s.i. Cooling water is then circulated through the platens so as to provide a cooling rate of from 20–50° F. per minute. A small "pea-size" specimen is cut from the prepared slab. The density is determined by the height at which the sample floats in an ethyl alcohol-water gradient column whose density at all levels is known. The density is reported as the value corrected to 23° C.

The crystallinity values are based upon measurements of nuclear magnetic resonance at approximately 75° F. The procedure which is followed to prepare the sample for test and to insure a close approach to equilibrium, is to (1) heat the polymer to a temperature about 50° C. above the crystalline melting point; (2) maintain the polymer at that temperature for approximately one hour, and (3) cool the polymer to room temperature at a rate characterized by a fall of 1.50° C. per minute at 135° C. This entire procedure is carried out in an environment essentially free of oxygen, e.g., nitrogen.

Crystalline melting point is the temperature where all crystallinity disappears when slowly heating as determined by use of a polarizing microscope.

Crystalline freeze point is the first plateau reached by a molten sample of polymer when slow cooled, e.g., on the time-temperature curve which is plotted by automatically recording, by means of thermocouples, the temperature of a sample of said molten polymer which is being allowed to cool slowly.

The polymer to be cracked can be prepared by any method known to the art. Preferably, the 1-olefin polymer will be one produced by the method of Hogan and Banks described in U.S. Patent 2,825,721 since such polymers have a very high crystallinity and softening temperature.

Another suitable (but less preferred and non-equivalent) method of preparing highly crystalline polymers is by polymerizing such olefins by contacting with organometal compounds such as the method described by Karl Ziegler in Belgium Patent 333,362.

Other methods for preparing such polymers as described in the literature on patents are also operable.

These high molecular weight, highly crystalline polymers are cracked under controlled conditions which comprises heating such a polymer in an inert atmosphere, such as nitrogen, at atmospheric pressure or slightly reduced pressure, usually not below 600 mm. of mercury, and at an internal temperature of the polymer in the range 600 to 900° F., preferably between 700 and 800° F. The polymer is heated rapidly until it is in the molten or liquid state. In some instances a product of the desired molecular weight and melting point, as hereinbefore specified, can be obtained by heating the polymer until it is all in the molten state and then removing the source of heat. In other cases the molten mass is stirred and heating is continued for a period which generally does not exceed 30 minutes. The time of heating is governed by the temperature employed and properties of the product desired. This method is fully described and claimed in the copending application of Canterino and Gallaugher, Serial No. 556,471, filed December 30, 1955.

As has been indicated, the high pressure polyethylene useful in this invention is a polyethylene prepared by the older well known high pressure process. Such a polymer ordinarily has a density of the order of 0.910 to 0.920 and crystallinities of not more than 65 percent. They ordinarily have molecular weights within the range 5,000 to 30,000 as determined by inherent viscosity. The polyethylene prepared by such a process will have a softening point in the range 200 to 215° F. and tensile strength at room temperature, e.g. 70° F., of the order of 1000 to 2000 p.s.i.

The ratio of cracked 1-olefin polymers to high pressure type polyethylene in the blends of this invention can be at any weight ratio within the range between 5/95 and 75/25, preferably in the range 10/90 and 50/50. The preferred ratios within this range will, of course be dictated by the properties of the blend which it is desired to obtain.

The advantages of this invention are more fully shown by the following examples.

EXAMPLE I

Four hundred grams of high molecular weight polyethylene, prepared by a chromium oxide-silica-alumina catalyzed polymerization at reaction conditions of approximately 300 F. and 500 p.s.i.g., was charged to a one liter flask. The flask contents were then heated to 700 F. by means of two Fisher burners and maintained at this temperature for 10 minutes. During the heating step, the flask contents were maintained under a nitrogen atmosphere. The total heating period was 38 minutes.

After 10 minutes at 700 F., the burners were removed, and the flask contents were allowed to cool to 400 F. in the flask. The flask contents were then poured onto a stainless steel slab and allowed to solidify. The yield of cracked polymer was 360 grams, and this material had a crystalline freeze point of 243±2. The Shore D hardness of this material was found to be 50.

The cracked high molecular weight polymer, prepared as described above, was blended with commercial high-pressure polyethylene (DYNH) by milling the two materials together on a roll mill at 275 F. for approximately ten minutes. Two blends, one containing 25 parts of cracked ethylene polymer per 100 parts of blend, and the other containing 50 parts per 100 parts of blend, were prepared by this method. The physical properties of these blends were then determined and compared with the two individual components. The results of these tests are expressed in Table I.

For comparison, the cracked polymer alone had an inherent viscosity of 0.3749, corresponding to a molecular weight of 9,165, and a melting point of 243±2. No other properties were determined.

EXAMPLE II

A commercially available highly crystalline polyethylene sold under the trademark "Marlex" and having a crystallinity of over 95% as determined by nuclear magnetic resonance at room temperature (70° F.) was cracked. Other properties of the polyethylene before cracking were as follows:

| | |
|---|---|
| Inherent viscosity | 1.1 |
| Viscosity molecular weight | 26,895 |
| Melt index | 8.512 |
| Density (gm./cc.) | 0.967 |
| Impact strength (ft. lbs./inch notch) | 0.75 |
| Stiffness | 169,000 |
| Tensile (yield)-comp. molded (p.s.i.) | 4,228 |
| Elongation (yield)-comp. molded (percent) | 5 |
| Crystalline freeze point, ° F. | 252 |

This material was cracked in a tube attached to a 1½ inch Modern Plastics Machinery Corporation extruder. The tube was heated by one internal cartridge heater and four sets of external heating bands. Manually operated powerstats were used to control the temperature.

The hot extrudate from the tube was collected in a container so constructed that most of the air was displaced by the usually abundant vapors produced during the cracking. Excess vapors were removed by means of an exhaust fan located near the discharge end of the unit. The properties of the cracked polymer resulting from the cracking of the above-identified polymer are given below along with the cracking conditions.

CRACKING CONDITIONS AND CRACKED POLYMER PROPERTIES

Conditions:

| | |
|---|---|
| Residence time in cracking tube, minutes | 3.0 |
| Maximum tube temperature, ° F. | 815 |
| Estimated extrusion rate, lbs./hr. | 9–10 |
| Extruder screw speed, r.p.m. | 46 |

Properties:

| | |
|---|---|
| Inherent viscosity | 0.28 |
| Viscosity molecular weight | 6,900 |
| Crystalline freeze point, ° F. | 247 |
| Crystallinity, percent | 90 |

This cracked polyethylene was then blended at various ratios with a conventional polyethylene sold under the trade mark of DYNH of the type described in Example I. Blends of DYNH were also made with a Fischer-Tropsch wax sold under the trademark "Paraflint" and with a low molecular weight conventional polyethylene sold as AC–6. The Fischer-Tropsch wax had an average molecular weight of approximately 750, had a melting point of 214° F., as reported in prior art, a structure similar to microcrystalline wax and a hardness at elevated temperatures similar to carnauba. The material otherwise resembled paraffin wax being similar in molecular structure and appearance. The low molecular weight paraffin wax had an inherent viscosity of 0.25 indicating a very low molecular weight, and a density of 0.916.

*Table I*

| Physical Properties [1] | Commercial Polyethylene | 25 Parts Cracked Polymer/ 75 Parts Commercial Polyethylene | 50 Parts Cracked Polymer/ 50 Parts Commercial Polyethylene |
|---|---|---|---|
| Density | 0.919 | 0.928 | 0.935 |
| Stiffness, p.s.i. | 20,000 | 41,000 | 53,000 |
| Melt Index | 2.529 | 11.825 | 37.755 |
| Flex Temp., °F. | −47 | −42 | Immeasurable. |
| Impact Strength, ft. #1/inch-notch. | 11.04 | 11.29 | Not Determined. |
| Softening Temp., ° F. | 212 | 228 | 246 |
| Tensile Strength, p.s.i. | 1,834 | 2,208 | 2,096 |
| Elongation, percent | 544 | 25 | 5 |
| Melting point, ° F. | 211±2 | 233±3 | 243±2 |

[1] See the following table:

| Property | Test (ASTM) | Sample |
|---|---|---|
| Density | | Compression Molded. |
| Stiffness | D747–50 | Do. |
| Melt Index | D1238–52T | Pelleted. |
| Flex Temp | D746–52T | Injection Molded. |
| Impact Strength | D256–47T | Do. |
| Tensile Strength | D638–52T | Compression Molded. |
| Elongation | D638–52T | Do. |

|  | Conventional Polyethylene (DYNH) Blended with — | | | | | | | | | Control |
|---|---|---|---|---|---|---|---|---|---|---|
|  | Cracked Crystalline Polyethylene | | | Fischer-Tropsch Wax | | | Conventional Polyethylene (AC-6) | | |  |
|  | 10% | 20% | 30% | 10% | 20% | 30% | 10% | 20% | 30% |  |
| Melt Index | 4.49 | 10.16 | 20.9 | 5.98 | 18.65 | 43.52 | 5.65 | 11.14 | 23.9 | 2.29 |
| Impact, p.s.i | 11.8 | 10.5 | 1.45 | 12.0 | 6.15 | 0.91 | 10.9 | 10.9 | 10.5 | 11.5 |
| Stiffness | 36,000 | 48,000 | 53,000 | 35,000 | 35,000 | 45,000 | 20,000 | 21,000 | 20,000 | 20,000 |
| Hardness, Shore D | 55 | 58 | 60 | 56 | 57 | 58 | 51 | 52 | 52 | 51 |
| Tensile, p.s.i | 1,654 | 1,930 | 2,268 | 1,780 | 1,846 | 2,008 | 2,384 | 1,382 | 1,410 | 1,382 |
| Elongation, percent | 177 | 42 | 27 | 74 | 34 | 28 | 258 | 72 | 55 | 385 |
| Abrasion Resistance gms. loss | ------ | 0.0212 | 0.0251 | 0.0191 | 0.0229 | 0.0325 | 0.0180 | 0.0256 | 0.0358 | 0.0182 |
| Moisture-Vapor-Transmission | 0.672 | 0.458 | 0.460 | 0.716 | 0.665 | ------ | 1.08 | 1.20 | 1.10 | 1.19 |
| Haze, percent | 10 | 35 | 40 | 18 | 16 | ------ | 14 | 15 | 13 | 10 |
| Warpage, percent | 0.32 | 0.30 | 0.24 | 0.29 | 0.30 | 0.26 | 0.28 | 0.37 | 0.35 | 0.48 |
| Flow, gms./min | ------ | 5.10 | 8.60 | ------ | 8.60 | ------ | ------ | 11.14 | ------ | 1.8 |
| Crystalline Freeze pt., °F | 233 | 233 | 242 | 217 | 214 | 213 | 214 | 214 | 213 | 219 |

From the above data, it can be seen that the cracked polymer blends were superior to the other blends in exhibiting higher stiffness, greater resistance to abrasion, higher crystalline freeze points and lower moisture-vapor-transmission. At a ratio of 70% conventional polymer to 30% material blended, the cracked polymer exhibited less warpage and greater tensile strengths. It is believed these data demonstrate an unobvious and unexpected improvement in polymer properties.

We claim:

1. As a composition of matter, a blend of (1) a pryolysis product obtained by thermally decomposing an ethylene polymer having a density ranging from 0.930 to 0.990 and a molecular weight greater than 25,000, said decomposition being effected by heating such a polymer to a temperature in the range 600 to 900° F. to produce a pyrolyzed polymeric material having a molecular weight in the range 2,000 to 12,000 and (2) polyethylene having a crystallinity not greater than 65 percent and a softening point less than 215° F., said product of decomposition constituting from 5 to 75 weight parts per 100 weight parts of said blend and said polyethylene constituting from 95 to 25 weight parts.

2. The blend of claim 1 wherein said decomposition product constitutes 10 to 50 weight parts of said blend and said polyethylene constitutes 90 to 50 weight parts.

3. The blend of claim 1 wherein said ethylene polymer is polyethylene.

4. As a composition of matter, a blend consisting of 10 to 50 parts by weight of (1) a pyrolysis product obtained by thermally decomposing an ethylene polymer having a molecular weight greater than 25,000, said decomposing being effected by heating said ethylene polymer to a temperature in the range 600 to 900° F. for a period of time not exceeding 30 minutes to produce a pyrolyzed polymeric product having a molecular weight in the range 2,000 to 12,000 and 90 to 50 parts by weight of (2) polyethylene having a density of 0.910 to 0.920, a molecular weight ranging from 5,000 to 30,000, a crystallinity not greater than 65% and a softening point in the range 200 to 215° F.

5. The blend of claim 4 wherein said ethylene polymer is polyethylene.

References Cited in the file of this patent

UNITED STATES PATENTS

| | | |
|---|---|---|
| 2,153,553 | Fawcett et al. | Apr. 11, 1939 |
| 2,692,259 | Peters | Oct. 19, 1954 |
| 2,791,576 | Field et al. | May 7, 1957 |
| 2,882,263 | Natta et al. | Apr. 14, 1959 |
| 2,994,679 | Jones et al. | Aug. 1, 1961 |